United States Patent [19]

Baker

[11] Patent Number: 5,079,407
[45] Date of Patent: Jan. 7, 1992

[54] BOIL CONDITION DETECTION DEVICE FOR A RANGE

[75] Inventor: Richard L. Baker, Ridgedale Township, Marion County, Ohio

[73] Assignee: Whirlpool Corporation, Benton Harbor, Mich.

[21] Appl. No.: 462,238

[22] Filed: Jan. 9, 1990

[51] Int. Cl.$^5$ .............................................. H05B 1/02
[52] U.S. Cl. ......................... 219/448; 219/450; 219/492; 219/506; 219/497; 340/602; 99/327
[58] Field of Search ............ 219/10.55 B, 10.55 M, 219/492, 506, 497, 494, 450, 448, 413; 340/602; 99/325, 327, 328, 329; 361/286

[56] References Cited

U.S. PATENT DOCUMENTS

| | | | |
|---|---|---|---|
| 3,696,360 | 10/1972 | Gajewski | 422/98 |
| 4,341,178 | 7/1982 | Price | 340/602 |
| 4,376,131 | 3/1983 | Mori et al. | 219/10.55 M |
| 4,465,228 | 8/1984 | Mori et al. | 236/20 A |
| 4,481,409 | 11/1984 | Smith | 219/518 |
| 4,493,981 | 1/1985 | Payne | 219/450 |
| 4,587,393 | 5/1986 | Ueda | 219/10.55 M |
| 4,665,292 | 5/1987 | Payne | 219/450 |
| 4,696,796 | 9/1987 | Oka et al. | 219/10.55 M |
| 4,781,469 | 11/1988 | Turon-Lagot | 374/27 |
| 4,791,263 | 12/1988 | Groeschel, Jr. | 219/10.55 M |
| 4,797,656 | 1/1989 | Keppler | 340/539 |
| 4,816,748 | 3/1989 | Tazawa et al. | 340/602 |
| 4,831,493 | 5/1989 | Wilson et al. | 361/286 |
| 4,909,070 | 3/1990 | Smith | 361/286 |

Primary Examiner—Mark H. Paschall
Attorney, Agent, or Firm—Hill, Van Santen, Steadman & Simpson

[57] ABSTRACT

A device for detecting a boiling condition of a liquid including a moisture sensor coupled to a detection circuit that provides an output signal, the output signal being coupled to any of various devices for, among things, providing an alarm signal, controlling a heating element, or turning a heating element off.

13 Claims, 3 Drawing Sheets

BOIL CONDITION DETECTION DEVICE FOR A RANGE

BACKGROUND THE INVENTION

The present invention generally relates to cooking ranges. The invention also relates to moisture detection devices. More specifically, the invention relates to the use of moisture detection devices in the cooking of foodstuffs.

The use of moisture detection devices in the cooking of foodstuffs is known. In U.S. Pat. No, 4,070,670 there is disclosed a safety controlled shut-off device for a heating element of a cooking stove wherein a sensor detects spillage beneath the heating element to thereby effect shut-off of the elements when a sufficient amount of liquid is detected. In U.S. Pat. Nos. 4,376,131; 4,587,393; and 4,791,263 there are disclosed microwave oven apparatus including moisture sensors that are employed to determine the state of foodstuff in the microwave ovens.

In U.S. Pat. No. 4,481,409, although a moisture sensor is not employed, a device is disclosed for detecting the boiling point of liquids by computation of weight loss of a liquid in a container on a heating element. The rate of the weight loss is stated to be indicative of evaporation rate and hence, boiling.

It would be advantageous to detect boiling of liquids in containers on heating elements in a simple manner so as to provide safety features to cooking ranges as well as prevent excessive boiling of the liquids.

SUMMARY OF THE INVENTION

The present invention provides a detector device for detecting a predetermined boiling condition of a liquid being heated on a surface element. To this end, the invention provides a moisture sensor that can be supported above a surface heating element for receiving vapor rising from a heated liquid. The vapor is sensed and the sensor produces a signal which can be used, among other things, to turn on an audible or visual alarm, as well as control the surface element being used to heat the liquid.

In an embodiment, the invention provides a sensor mounted beneath a hood or eye-level oven of a freestanding or built-in range that senses vapor emitted from a liquid being heated on the range.

In another embodiment, the invention provides a sensor mounted on a portable support member that can be located on a container.

In an embodiment, the moisture sensor is of the capacitance type wherein a moisture sensitive film of polyelectrolyte is formed between a pair of electrodes on an insulator or semiconductor.

In another embodiment, when the onset of boiling is detected, circuitry dedicated to one or more of the surface elements of the range turns off, cycles, or reduces power to the element in use.

In another embodiment, the circuitry directs an output to a buzzer to audibly indicate to a user that a boiling condition has been reached.

In yet another embodiment, the sensor can be used to indicate a boil dry condition wherein the sensor senses a first boiling condition and signals a user or controls the heating element when the first boiling condition is no longer sensed.

An advantage of the invention is the prevention of a boil dry condition by means of turning off or reducing the power to an element when a boiling condition is either first sensed or no longer sensed.

Another advantage of the invention is the signalling of a user that a boiling condition or a boil dry condition has been reached.

A significant advantage of the invention is an improved range wherein certain aspects of the cooking of foodstuffs such as liquids is monitored automatically by the range.

These and other advantages and features of the invention will become more apparent with reference to the following detailed description of the presently preferred embodiments and the accompanying drawings.

DETAILED DESCRIPTION OF THE PRESENTLY PREFERRED EMBODIMENTS

Figure 1:
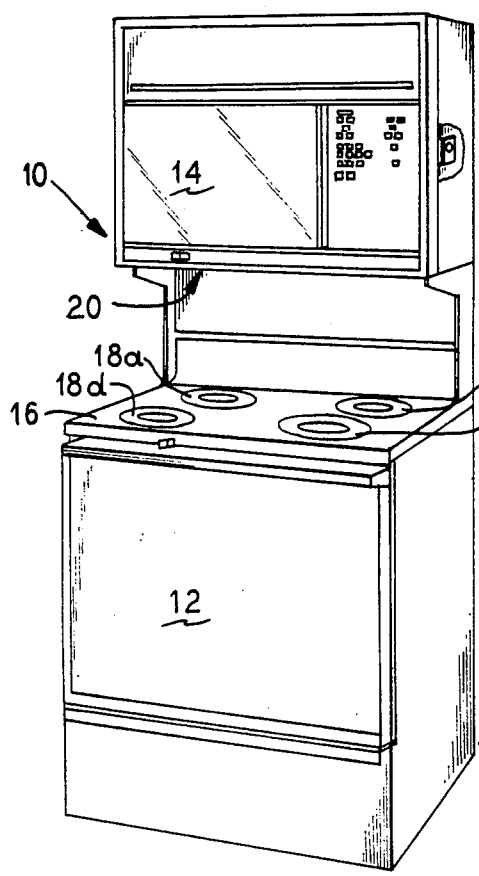
FIG. 1 illustrates in perspective view a typical combination range that employs the principles of the present invention.

In FIG. 1 there is illustrated a range 10 that is suitable for adaptation to include a boil condition detection device in accordance with principles of the invention. As illustrated, the range 10 includes a lower oven 12, an upper microwave oven 14, and a range cooking surface 16 including four heating elements 18a–18d. The range 10 is known as a combination range because it includes the conventional oven 12, the microwave oven 14, as well as the cooking elements 18a–18d.

It can be appreciated that the principles of the invention relate not only to combination ranges but also to other ranges including conventional dutch ovens in place of the microwave oven 14 as well as hoods including exhaust fans without ovens. Further, the principles of the invention are applicable to ranges placed beneath separate surfaces such as under a cupboard wherein a surface or hood element is extended over a range surface such as the surface 16.

Figure 2:
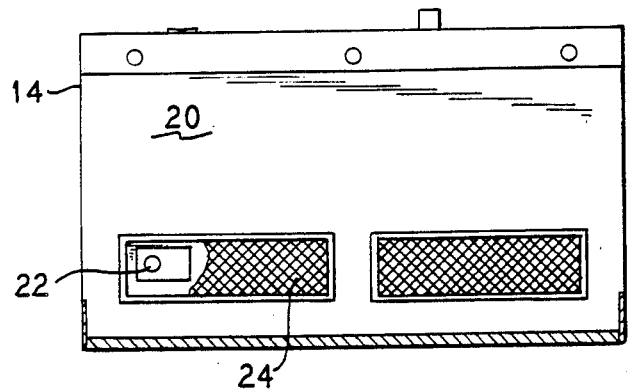
FIG. 2 illustrates the underside of the hood or oven of the range of FIG. 1 so as to illustrate the positioning of a moisture accordance with principles of the invention.

In FIG. 2, an underside 20 of the microwave oven 14 is illustrated wherein it can be seen that in the preferred embodiment, a sensor is positioned so as to be located above the heating element 18a, which is located at the right rear portion of the range surface 16. In FIG. 2, a portion of a grease filter 24 has been eliminated so as to provide a view of the sensor element 22.

While in the embodiment illustrated in FIG. 2, only one sensor 22 is depicted, it can be appreciated that a plurality of such sensors can be positioned beneath the microwave 14. In such case, one or more or all of the heating elements 18a–18d can be monitored by moisture sensors 22. However, for the purposes of the following description, only one such sensor 22 need be described.

Figure 3:
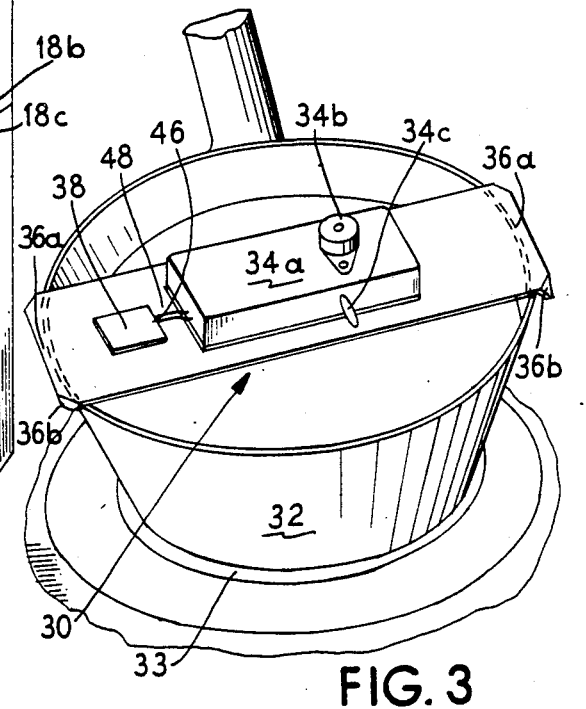
FIG. 3 illustrates an alternate embodiment of the invention in the form of a portable unit wherein a moisture sensor is placed across a container containing a liquid.

In FIG. 3, there is illustrated an alternate embodiment of the invention wherein a portable device 30 is provided that can be placed on top of an open container, in this case a pan 32 within which a liquid is being heated on a surface heating element 33.

The device 30 includes circuitry housing 34a on which is mounted an audible alarm 34b and in which is mounted an on/off switch 34c. The housing 34a is itself mounted on a planar surface support member 36 such as a sheet of aluminum or plastic. Similarly, a moisture sensor 38 similar to the sensor 22 is also mounted on the planar surface member 36. Ends 36a of the support member 36 have appropriate downward projections 36b, such as folded down corners to prevent the support member 36 from being dislodged into the container 32.

Figure 4:
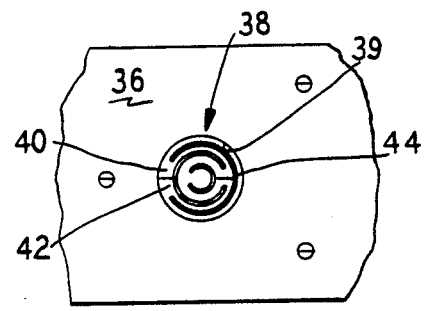
FIG. 4 illustrates the sensor elements of a sensor employed in accordance with the principles of the invention.

It can be appreciated that the planar surface member 36 includes a suitable aperture 39 on its underside so as to expose the sensor 38 to vapors eminating from the heating liquid as illustrated in FIG. 4.

In the embodiment illustrated in FIG. 3, a sensor can be placed directly over a container of heated liquid so as to detect heating of only that liquid. It can be appreciated that the sensitivity of the circuitry associated with the sensor 38 must be adjusted so that the circuitry only responds to heavy condensation build-up.

The embodiment of FIG. 3 is advantageous in that it is portable, commercial power supply voltage spikes do not affect operation of the device because it is battery operated, it provides better detection in spite of breezy conditions that might otherwise remove or steer vapors away from a permanently mounted sensor, and it can be used in connection with virtually any type of heating element.

In FIG. 4 there is illustrated a portion of the sensor 38 wherein the electrodes of the preferred capacitance type moisture sensor can be seen. As illustrated in FIG. 4, with reference also to FIG. 3, the sensor 38 includes a moisture sensitive film of polyelectrolyte 40 formed between a pair of electrodes 42 and 44 on an insulator 46. A pair of leads 48 couple the sensor 38 to the circuitry within the housing 34a.

When moisture collects on the surface of the sensor 38, a bridge is formed between the electrodes 42 and 44 which allows a current to pass therebetween and thus, to allow current to flow within a circuit coupled to the sensor 38. This current can be detected and measured and used to indicate the presence of the moisture.

In place of a capacitance type moisture sensor, other types of sensors can be employed with suitable changes which should be readily apparent to those of skill in the art. For example, resistive type sensors can be employed.

Figure 5:
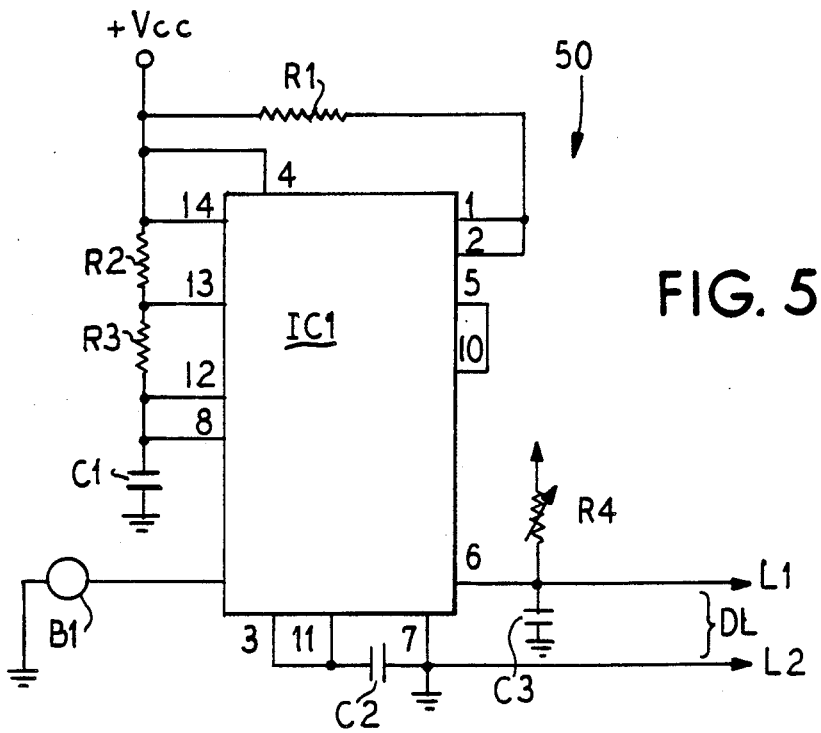
FIG. 5 is a schematic diagram illustrating an electronic circuit embodying principles of the invention that effects energization of a buzzer to provide an audible alarm.

In FIG. 5, there is illustrated a typical electronic circuit 50 to which the sensor 22 or 38 can be coupled to provide an audible alarm indicating the presence of moisture on the sensor 22. The illustrated circuit 50 employs an integrated circuit dual timer IC1 (i.e., it includes two timer circuits in a single package) marketed as a semiconductor chip package under the designation NE556 by Signetics Corporation. This timer is known in the art generally as a 556 timer and is available from many manufacturers. It is known that such a device includes two 555 timer devices in a single package. As will become clear, one timer A of the integrated circuit IC1 is employed as a detector and is coupled to the moisture sensor while the other timer B is employed to provide an output signal used to actuate devices coupled thereto.

In the circuit 50, a resistor R1 having a value of 100K $\Omega$ and a rating of ¼ watt is coupled between timer A discharge pin 1 and timer A reset pin 4 of the integrated circuit IC1. Pin 4 is also connected to a supply voltage Vcc, which ranges between 5 and 15 volts d.c. Supply voltage pin 14 is also coupled to the power supply Vcc. A resistor R2 having a value of 1K $\Omega$ and a rating of ¼ watt is coupled between the supply voltage pin 14 and timer B discharge pin 13. A resistor R3 having a value of 1M $\Omega$ and a rating of ¼ watt is coupled between timer B discharge pin 13 and timer B threshold pin 12. A capacitor C1 having a value of 0.47 $\mu$f is coupled between ground and timer B trigger pin 8.

Pins 8 and 12 are coupled together as are pin 1 and timer A threshold pin 2, and timer A control voltage pin 3 and timer B control voltage pin 11.

One lead of a capacitor C2 having a value of 0.01 $\mu$f and a rating of ¼ watt is coupled to pins 3 and 11 while the other lead is coupled to ground pin 7 and ground. Pins 3 and 11 usually receive a control voltage as is well-known in the art.

Coupled to timer A trigger pin 6 is one lead of a capacitor C3 having value of 0.01 $\mu$f and a rating of ¼ watt, the other lead of which is coupled to ground. A variable resistor R4 having a value ranging from 1K $\Omega$ to infinity is coupled between the pin 6 and the supply voltage Vcc.

As is illustrated, the pins 6 and 7 are coupled to the output leads of the sensor 22 via leads L1 and L2.

In operation, when moisture causes bridging across the electrodes of the moisture sensor, such as the sensor 22 or 38, the timer A trigger pin 6 will be grounded. This, in turn, causes timer A of integrated circuit IC1 to provide a suitable output signal to timer B reset pin 10. Because the output of timer A at pin 5 is coupled to the reset pin 10 of timer B, timer B will be triggered to switch on and off in a manner similar to an astable multivibrator. Accordingly, a square wave signal will be produced at timer B output pin 9 to the tone generator B1. Drying of the sensor or removal of the power Vcc, such as by disengagement via a suitable switch, will cause the tone generator B1 to turn off and the detection circuitry to reset.

Because the preferred sensor is of the capacitive type, it can be appreciated that the spacing of the electrodes forming the capacitor is of critical importance. The distance between the electrodes will determine the sensitivity of the sensor. Accordingly, the distance DL between the leads L1 and L2 as well as the electrodes forming the sensor is selected depending on the sensitivity required. Typically, this distance ranges between 0.05 and 2 millimeters. The more closely the electrodes are spaced, the more sensitive the sensor.

Furthermore, the sensitivity of the circuit 50 to the sensor coupled thereto can be adjusted via the variable resistor R4. It can be appreciated that when lower voltages are provided at pin 6, by increasing the resistance of R4, the circuit 50 will be more sensitive to grounding and will react more quickly to bridging across the electrodes of the sensor.

It can also be appreciated that capacitor C2 and C3 are provided to improve noise rejection by the circuits. Non-direct current charges are effectively directed to ground via these capacitors.

It can further be appreciated that in the illustrated circuit, the resistors R2 and R3 determine pulse lengths of the signal generated at pin 9 while the capacitor C1 determines cycle time. Thus, the resistors R2 and R3 and capacitor C1 are selected to provide selected pulse trains at output pin 9 as is well-known to do with 556 chips.

Figure 6:
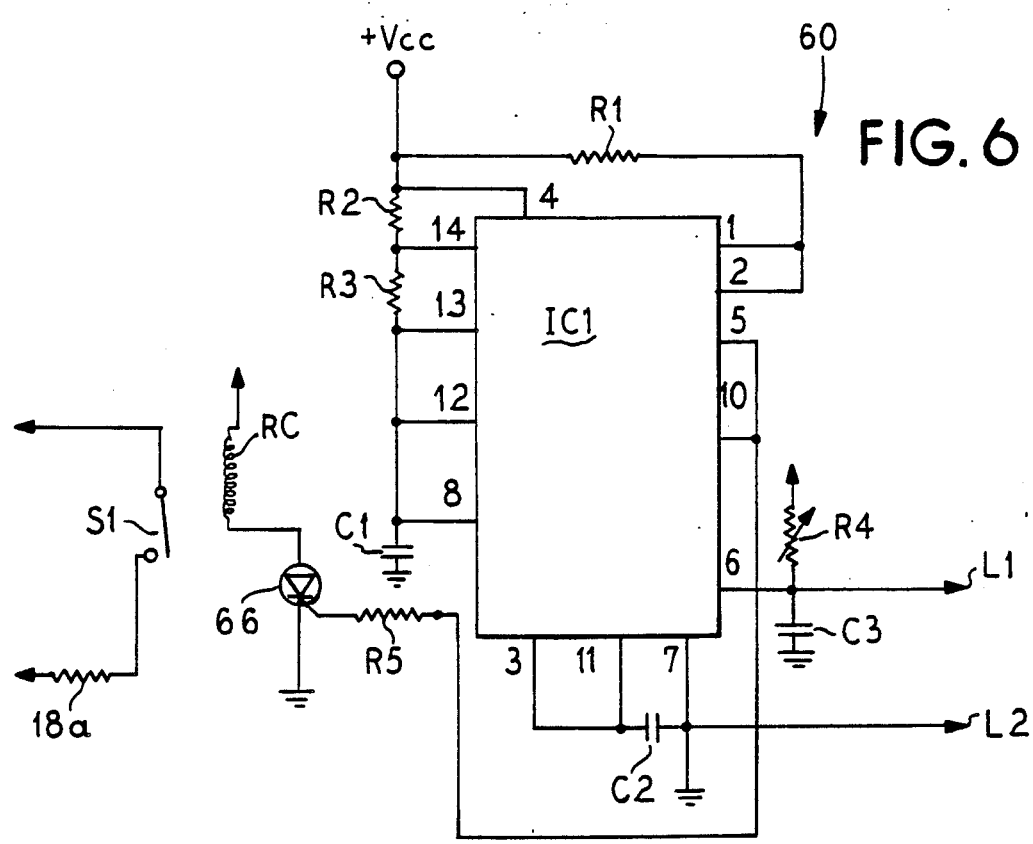
FIG. 6 is a schematic diagram of an electronic circuit embodying principles of the invention that provides shut-off of a range heating element

In FIG. 6 there is illustrated an alternate electronic circuit 60 that is set up for shutting off a range heating element when a detection of boiling is made. The circuit 60 in FIG. 6 is very similar to the circuit 50 illustrated in FIG. 5 and, accordingly, like elements have been designated the same. The functions of identical elements are the same and, accordingly, will not be described further. However, differences are noted below.

Coupled to the output pin 5 integrated circuit IC1 is a latch circuit LC that is designed to turn off a range element, in this case the range element 18a associated with the boiling sensor 22. To that end, a coupling resistor R5 having a value of 1K Ω and a rating of 1 watt is coupled between pin 5 and a gate of a silicon control rectifier (SCR) 66. The output of the SCR 66 is coupled to ground while the input is coupled to a relay coil RC having another lead coupled to the supply voltage Vcc. It can be appreciated that when a boil condition has been detected, a continuous voltage signal is provided at pin 9 which triggers the SCR 66. The triggered SCR 66 causes energization of the relay coil R1 which, in turn, causes the opening of normally closed contact S1. Normally closed contact S1 is coupled in series with the circuit of the range heating element 18A and thus, power to the heating element is disengaged.

It can be appreciated that the buzzer B1 can also be coupled to pin 9 as described above. Then, the buzzer B1 will alert the user that the liquid being heated has come to a boil and that the element 18a has been turned off.

It can further be appreciated that inasmuch as the circuit LC is coupled to the output pin 5 of timer A of integrated circuit IC1, only timer A is required to effect detection of moisture and shut-off of the element 18a. Accordingly, the integrated circuit IC1 could readily be replaced by a 555 timer device to effect the same function, if desired.

Figure 7:
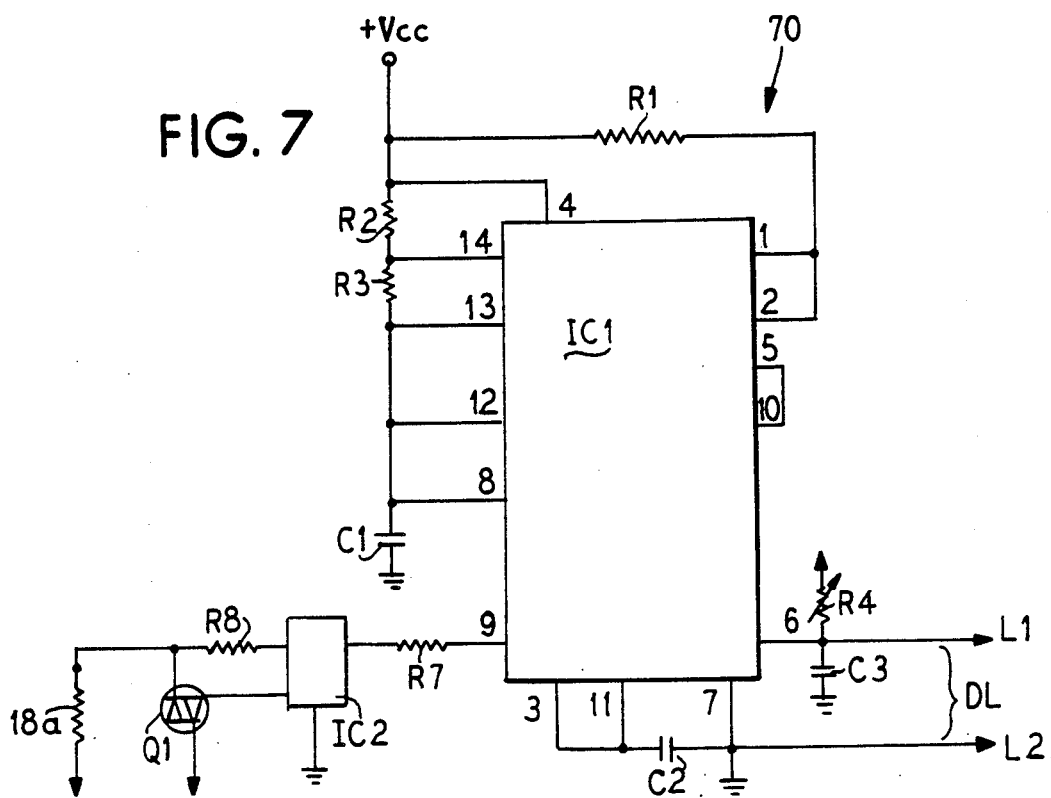
FIG. 7 is a schematic diagram of an electronic circuit embodying principles of the invention that effects cycling of a range element.

In FIG. 7 there is illustrated yet another electronic circuit 70 embodying principles of the invention that is similar to the circuits illustrated in FIGS. 5 and 6 but which is set up for cycling the range element 18a once a detection of a boiling condition has been made. To this end, in place of the latch circuit LC illustrated in FIG. 6, there is included a cycling control circuit 72 that is coupled to timer B output pin 9 of the integrated circuit IC1 via a resistor R6 having a value of 270 Ω and a rating of ¼ watt.

The resistor R6 in turn is also coupled to pin 1 of an optical coupler IC2, which is marketed under the designation ECG 3097 by Sylvania Corporation. IC2 is provided for isolation purposes to isolate cycling control circuit 72 from the remainder of the circuit 70.

The optical coupler IC2 in turn has power input pin 6 to which is coupled a resistor R7 having a value of 180Ω. The resistor R7 is also coupled to one side of the range element 18a and to one side of a triac Q1, which is marketed under the designation SC160D by Sylvania Corporation. The gate of the triac Q1 is coupled to output pin 4 of the optical coupler IC2.

The other side of the triac Q1, as well as the other side of the range element 18a form leads L3 and L4 which are coupled to a 240 volt A.C. power source.

In operation, when moisture is sensed, a pulse signal will be provided at timer B output pin 9 as described above. This pulse is an on-off signal that will cause the triac Q1 to turn the element 18a on-off, in cyclic fashion. It can be appreciated that the cycle parameters, i.e., duty cycle and frequency are determined by the values of R2, R3, and C1.

Figure 8:
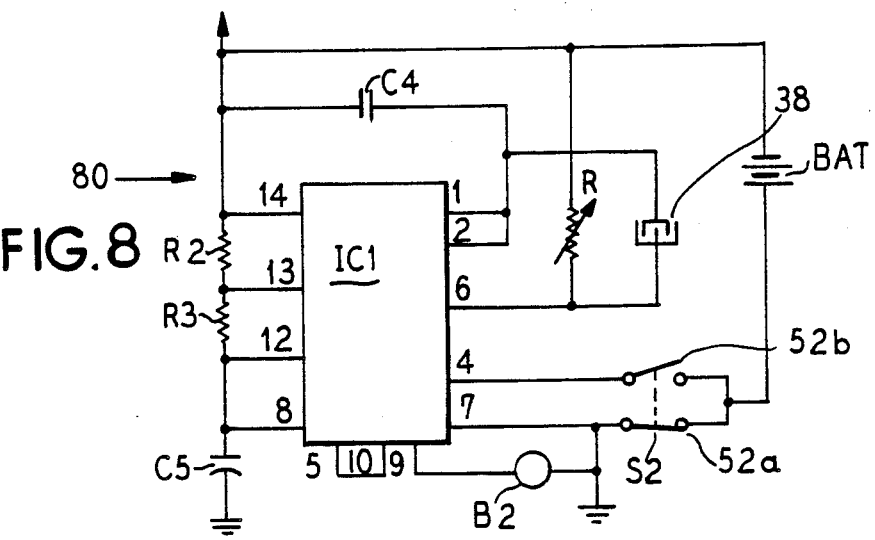
FIG. 8 is a schematic diagram of an electronic circuit embodying principles of the invention that can be employed in the unit embodiment of FIG. 3.

In FIG. 8, there is illustrated an electronic circuit 80 that can be used in connection with the portable unit embodiment illustrated in FIG. 4. In the circuit 80, the same circuit elements that correspond to the circuit elements described previously are again referenced by the same designations.

It can be appreciated that because the circuit 80 is designed for a portable unit, it must be designed to receive its power from a battery. Accordingly, the circuit 80 includes a 9 volt battery BAT. The circuit 80 is expected, during normal use, to use up the battery over the course of about ½ year, in view of current battery technology.

The battery BAT has its negative terminal coupled to one side of a single pole double throw power switch S2 shown in its "on" position. The switch S2 includes two contacts 52a, 52b, one of which, 52a, is normally open, the other of which, 52b, is normally closed. The battery BAT is coupled in common to one side of each. The other side of the normally open contact 52a is coupled to pin 7 of integrated circuit IC1, while the other side of the normally closed contact 52b is coupled to pin 4 of integrated circuit IC1.

A tone generator B2 is coupled between pins 7 and 9. The positive input terminal of the tone generator B2 is coupled to pin 9.

The sensor 38 is coupled between pin 6 and pins 1 and 2. A variable resistor R8 is coupled between the power supply BAT and pin 6 so as to adjust the sensitivity of the circuit to the sensor 38 as described above in connection with the circuit 50 illustrated in FIG. 5.

A capacitor C4 is coupled between pins 1 and 2 and the supply voltage. Capacitor C4 preferably has a value of 33 μf and 16 volts.

Pins 8, 12, 13, and 14, as well as resistors R1 and R2, are connected as previously described.

A capacitor C5 is coupled between pins 8 and ground instead of the capacitor C1. Capacitor C5 preferably has a value of 1 μf and a rating of 16 volts.

In use, the circuit 80 will provide a pulsating audible single such as intermittent beeps upon detection of sufficient moisture on the sensor 82. The circuit is reset by turning actuating switch S2 to its off position and wiping dry the surface of the sensor 82 that is covered with moisture.

Further, by throwing the switch S2 back and forth, a short tone or "beep" will be produced. This provides an indication of battery strength.

In all other respects, the circuit 80 operates in a manner similar to any of circuits 50, 60, and 70.

Figure 9:
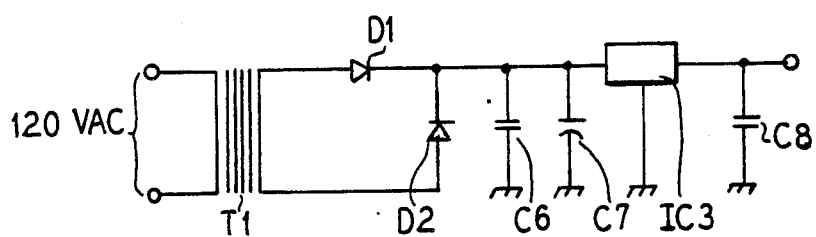
FIG. 9 is a schematic diagram of a typical power supply employed in the electronic circuit illustrated in FIGS. 5, 6, 7, or 8.

In FIG. 9 there is illustrated a power supply circuit 90 that can be employed in conjunction with any of circuits 50, 60, 70, or 80. However, it can be appreciated that when used in conjunction with circuit 80, the unit will no longer enjoy battery power portability.

In the circuit 90, there is provided a transformer T1, the primary side of which is connected to a 120 volt a.c. power source such as the input line of a range. The transfer T1 produces a voltage of 24 volts a.c. at its secondary side.

A diode D1 is coupled to one output line of the secondary side of the transfer T1. A second diode D2 is coupled to the other line and to the output of diode D1. Both diodes D1 and D2 preferably comprise diodes marketed under the designations ECG 116 by Sylvania Corporation and have a rating of 600 PRV at 1 amp.

A pair of capacitors C6 and C7 are coupled between ground and the commonly connected outputs of the diodes D1 and D2. Capacitor C6 preferably is a ceramic capacitor and has a value of 0.1 $\mu f$ and a rating of 50 volts. Capacitor C7 preferably is an electrolytic capacitor and has a value of 470 $\mu f$ and a rating of 35 volts. Capacitors C6 and C7 provide power line filtering as is well-known.

The filtered and rectified output of the transfer T1 is then provided to a semiconductor voltage regulator IC3. Voltage regulator IC3 preferably comprises a regulator marketed under the designated ECG 950 by Sylvania Corporation. The output of voltage regulator IC3 is a regulated 12 volts and 100 mA.

For further filtering, a capacitor C8 is coupled between ground and the output of the voltage regulator IC3. Capacitor C8 preferably is a ceramic capacitor and has a value of 0.1 $\mu f$ and a rating of 50 volts.

It can be appreciated that circuits 50, 60, 70, and 80 can easily be altered to provide to detection of a boiling condition. For example, the direct connection between pins 5 and 10 (or, in the case of circuit 60, the input to the latch circuit LC) can be removed and an appropriate flip-flop circuit coupled therebetween. The flip-flop circuit would produce an appropriate continuous high signal only upon detection of a transition from a high to a low signal at pin 5. Further, an appropriate switch can be incorporated so that either onset of boiling or a boildry is the predetermined boiling condition about which a user is alerted on in response to which an action is taken, such as shut off of the appropriate heating element.

It is currently envisioned that the outputs of the circuits 50, 60, 70, and, in some embodiments, circuit 80 can be provided to electronic control circuitry of an upper oven of a combination range. Thus, use can be made of existing audible alarm devices, etc.

Further, it can be appreciated that a single sensor can be used in a hood of a range. But in such a case, the sensor would not be dedicated to a single surface element as vapors from liquids placed on any element would reach the hood.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonable and properly come within the scope of our contribution to the art.

The embodiments of the invention in which an exclusive property or privilege is claimed are defined as follows:

1. A device for detecting moisture, comprising:
   A moisture sensor which provides a first signal in the presence of moisture, said moisture sensor comprising a capacitor that is sensitive to moisture; and
   a timer circuit coupled to said first signal, which timer circuit provides a second signal in response to receipt of said first signal by said timer circuit, said timer circuit comprising two timers, one of which is operatively arranged to form an astable multivibrator and another of which is operatively arranged coupled to said sensor to provide an intermediate signal to trigger said astable multivibrator in response to receipt of said first signal from said sensor.

2. The device of claim 1, further including an audible alarm apparatus coupled to said timer circuit, said audible alarm producing an audible tone in response to receipt of said second signal.

3. The device of claim 1, wherein said timer circuit comprises an astable multivibrator.

4. A cooking range comprising:
   a range surface including at least one hear source;
   a moisture sensor positioned above said heat source to sense a boiling condition of a liquid heated on said heat source; and
   a circuit operatively coupled to said moisture sensor and said range surface to control said heat source in response to said sensing of said predetermined boiling condition, said circuit including a timer circuit having two timers, one of which timers is operatively configured to provide as astable multivibrator and the other of which is operatively coupled to said sensor to provide an intermediate signal to trigger said astable multivibrator in response to receipt of a signal from said moisture sensor.

5. The range of claim 4, wherein said predetermined boiling condition is onset of boiling.

6. The range of claim 4, wherein said predetermined boiling condition is a termination of boiling.

7. The cooking range of claim 4, wherein said control circuit regulates said heat source by turning said heat source on and off.

8. A detection apparatus for sensing the boiling condition of water in a cooking utensil located on a cooking surface with heating means for providing energy to said cooking utensil located on said cooking surface, comprising:
   moisture sensing means mounted above said cooking surface for sensing a predetermined boiling condition of water within said cooking utensil and supplying a first signal;
   a timer circuit operatively coupled to said moisture sensing means and including two timers, one of said timers operatively configured to provide an astable multivibrator, the other timer operatively configured to receive said first signal from said moisture sensing means and to provide an intermediate signal to trigger said astable multivibrator in response to receipt of said first signal from said sensor; and
   control means providing a second signal responsive to said first signal for controlling said heating means in response to said moisture sensing means sensing a predetermined boiling condition.

9. A detection apparatus as defined in claim 8, wherein said moisture sensing means comprises a capacitive moisture sensor.

10. A detection apparatus as defined in claim 9, further including an exhaust hood mounted above said cooking surface, wherein said capacitive moisture sensor is mounted on said exhaust hood.

11. A detection apparatus as defined in claim 8, wherein said moisture sensing means includes a plurality of user-selectable predetermined levels of sensitivity.

12. A detection apparatus as defined in claim 8, further including an audible alarm responsive to one of said moisture sensing means and said control means.

13. A detection apparatus as defined in claim 8, wherein said timer circuit comprises a 556 timer semiconductor device, wherein a first timer of said 556 timer semiconductor device is operatively coupled to receive said first signal and to provide said intermediate signal, and wherein a second timer of said 556 timer semiconductor device is operatively arranged and connected to said intermediate signal to act as an astable multivibrator and provide said second signal.

* * * * *